United States Patent Office 2,965,079
Patented Dec. 20, 1960

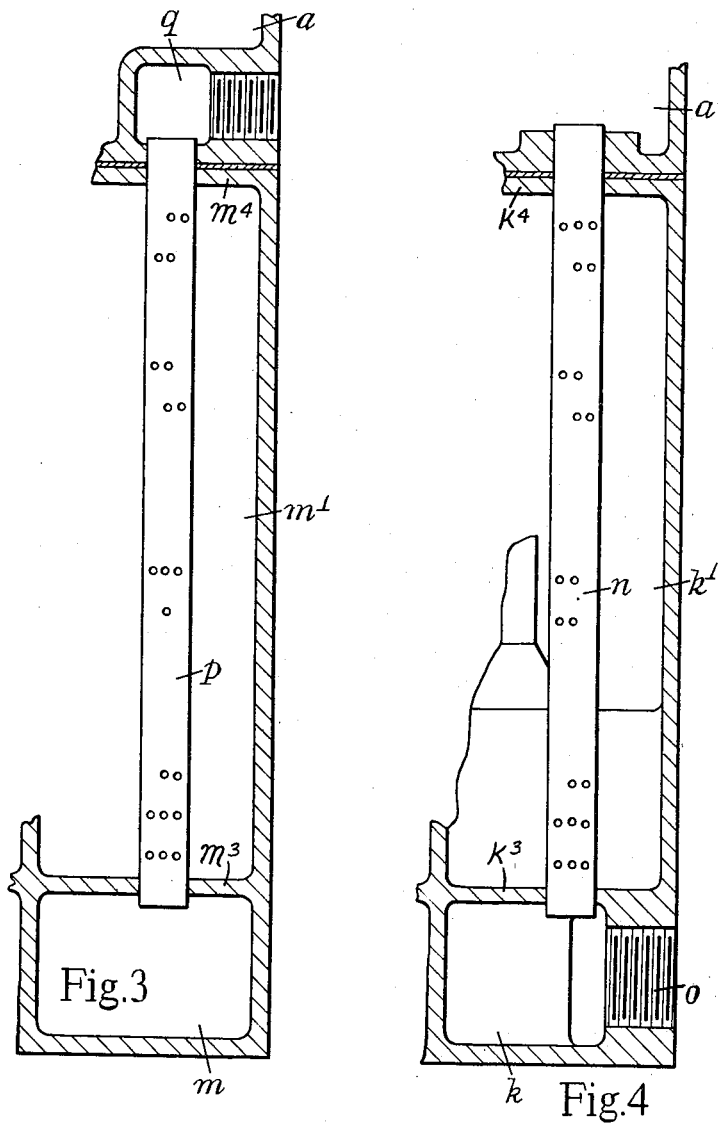

2,965,079
WATER HEATING APPARATUS

Eric S. Collinson, Loveland, Ohio, assignor, by mesne assignments, to Lucas-Rotax Limited, Ontario, Canada Filed July 8, 1957, Ser. No. 670,534

Claims priority, application Great Britain July 11, 1956

2 Claims. (Cl. 122—24)

This invention relates to domestic or other water heating apparatus of the kind adapted to utilize gaseous fuel, and has for its object to provide such an apparatus in a convenient and efficient form.

An apparatus in accordance with the invention comprises an upper air chamber, a lower exhaust gas chamber and an intermediate water chamber, a gas combustion means of the type adapted to operate in a pulsatory manner contained in the water chamber, heat exchange tubes interconnecting the combustion means and the exhaust gas chamber, and exhaust gas and air silencing means incorporated with the apparatus.

Figure 1:
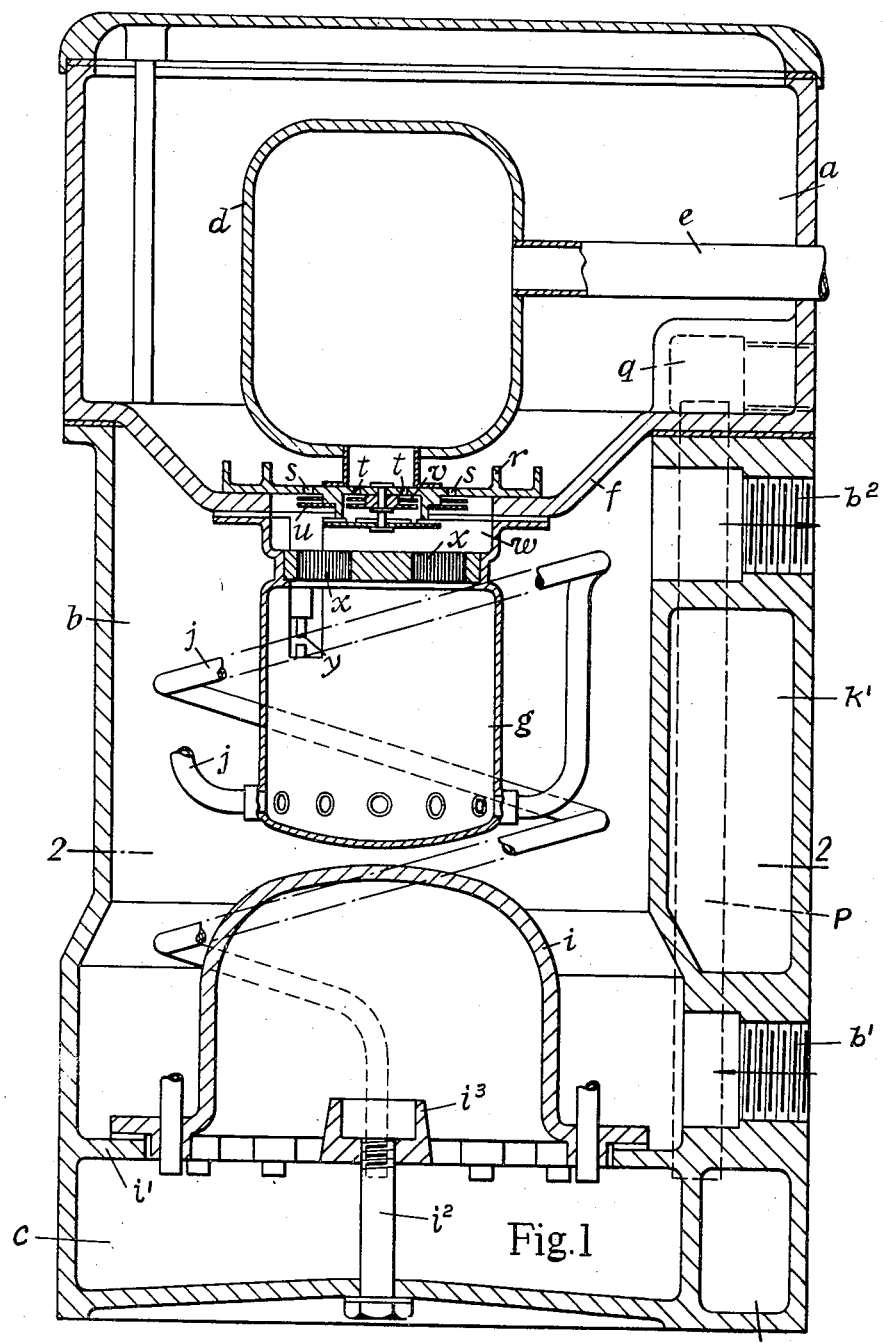
Figure 2:
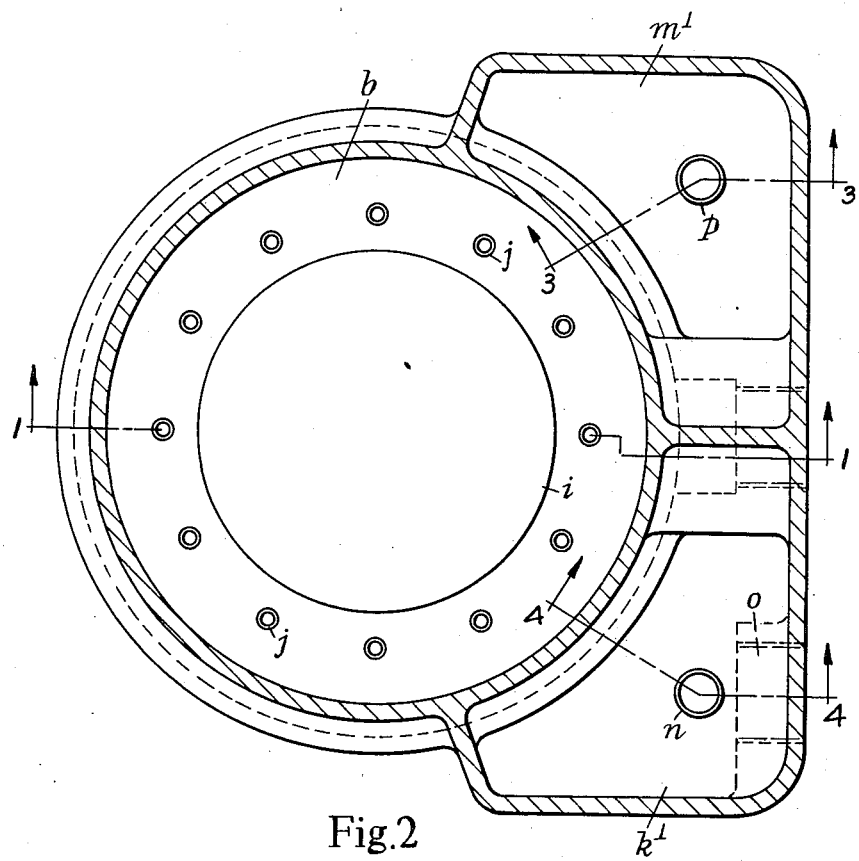

In the accompanying drawings, Figure 1 is a sectional front elevation of an apparatus constructed in accordance with the invention, and Figure 2 is a sectional plan, Figure 1 being taken on the line 1—1 of Figure 2, and the latter being taken on the line 2—2 of Figure 1. Figures 3 and 4 are detail sectional views respectively taken on the lines 3—3 and 4—4 of Figure 2 and illustrating the means for discharging exhaust gas from the apparatus, and the means for conveying air to the apparatus.

Referring to the drawings, the apparatus there shown comprises three superimposed chambers $a$, $b$, $c$. The chamber $a$ receives air for supplying the combustion chamber and contains a gas cushioning chamber $d$ to which is connected a gas supply pipe $e$. The chamber $d$ is carried by the partition $f$ between the chambers $a$, $b$, and to this partition is attached the combustion chamber $g$ which is contained in the water chamber $b$. The means for controlling the flow of air from $a$ to $g$, and gas from $d$ to $g$ will be described later. The chamber $c$ which is relatively shallow serves to receive the exhaust gases from the combustion chamber, and on it is formed a dome $i$ which extends into the water chamber $b$. The dome $i$ has a flanged lower end, and serves with an annular support $i^1$ to form a partition between the water and exhaust chambers $b$, $c$. A screw $i^2$ passing through the exhaust chamber $c$ into engagement with a central boss $i^3$ at the lower end of the dome $i$ serves to secure the latter to the support $i^1$. The lower end of the combustion chamber $g$ is connected to the chamber $c$ by heat exchange tubes $j$ which are contained in the water chamber.

Also there are incorporated with the chambers $b$, $c$, two bi-compartmental chambers $k$, $k^1$, and $m$, $m^1$. The compartments $k$ and $k^1$ are separated from each other by a partition $k^3$, and the compartment $k^1$ is separated from the chamber $a$ by a partition $k^4$. Extending through the compartment $k^1$ is a perforated pipe $n$ having open ends situated respectively within the chamber $a$ and the compartment $k$, the compartment $k^1$ being closed apart from openings provided in the partitions $k^3$ and $k^4$ for accommodating the adjacent parts of the perforated pipe $n$. Air is admitted to the compartment $k$ through an inlet $o$ and from this compartment it passes through the pipe $n$ to the chamber $a$, the compartment $k^1$ serving as a silencer for minimizing any noise which may accompany the inflowing air. The compartments $m$ and $m^1$ are separated from each other by a partition $m^3$, and the compartment $m^1$ is separated from the chamber $a$ by a partition $m^4$. Extending through the compartment $m^1$ is a perforated pipe $p$ having open ends, one of these ends being situated within the compartment $m$, and the other being situated within a discharge pocket $q$ in the chamber $a$. The compartment $m$ is in communication with the exhaust gas chamber $c$, and from it the exhaust gas passes through the perforated pipe $p$ to the discharge pocket $q$ in the chamber $a$, the said pocket being adapted for the connection to it of a flue pipe, and the compartment $m^1$, which is closed apart from openings provided in the partitions $m^3$ and $m^4$ for accommodating the adjacent parts of the perforated pipe $p$, serving as a silencer for minimizing any noise which may accompany the outgoing exhaust gas. If desired the compartments $k^1$ and $m^1$ may be loosely packed with any convenient material for increasing the silencing effect of these compartments.

On the partition $f$ between the air chamber $a$ and the water chamber $b$ are mounted the valves which control the intermittent flow of gas and air to the combustion chamber $g$. The combustion in the said chamber is of the pulsatory kind which causes automatic actuation of the air and gas valves. On the partition $f$ is secured a valve seating member $r$ having therein ports $s$ through which air can flow, and ports $t$ through which gas can flow. The air ports are controlled by a closure member $u$ consisting of a light and freely movable annular disc of any convenient material, and the gas ports are controlled by a similar disc $v$. The gas and air mix in a chamber $w$ and then flow through a flame trap $x$ to the combustion chamber $g$, ignition of the mixture being initiated by an electric spark plug $y$. The mode of action of the valves is essentially similar to that described in the specification of Patent No. 2,898,978, the pulsatory pressures in the combustion chamber causing the closure members to move toward and away from the ports intermittently.

Control of the gas supply is effected by any convenient valve arranged in the gas pipe either externally of the apparatus or within the chamber $a$. The water to be heated is supplied to the inlet $b^1$ at the lower part of the chamber $b$ and withdrawn from the outlet $b^2$ at the upper end.

When the apparatus is in action, the water is heated by the heat flow through the walls of the combustion chamber, the pipes $j$ and the dome $i$. The exhaust gases are collected in the chamber $c$ and discharged through the pipe $p$. The air required for combustion is supplied through the pipe $n$, either directly from the atmosphere or by a blower.

Having thus described my invention what I claim as new and desire to secure by Letters Patent is:

1. A gas-fired water-heating apparatus comprising in combination an upper air chamber, a lower exhaust chamber, a water chamber situated between the air chamber and the exhaust chamber, and provided at its lower and upper parts respectively with a water inlet and a water outlet, means separating the water and exhaust chambers, a partition separating the air and water chambers, gas combustion means of the pulsatory type carried by the partition and including a combustion chamber situated in the upper part of the water chamber, a gas supply pipe, valves forming parts of the combustion means and responsive to pressure in the combustion chamber for controlling communication of the latter with the air chamber and gas supply pipe, a plurality of heat exchange tubes situated in the water chamber and interconnecting the lower end of the combustion chamber and the exhaust chamber, a first bi-compartmental sub-chamber incorporated with one side of the water and exhaust chambers, a second bi-compartmental sub-chamber incorporated with the same side of the water and exhaust chambers and situated alongside the first bi-compartmental sub-chamber, an exhaust gas outlet adjacent the upper part of the first sub-chamber, a perforated exhaust gas pipe extending through one of the compartments of the first sub-chamber, and connecting the other compartment thereof to the exhaust gas outlet, the last mentioned compartment being in communication with the exhaust chamber, and a perforated air supply pipe extending through one of the compartments of the second sub-chamber, and connecting the other compartment thereof to the air chamber, the last mentioned compartment having an air inlet.

2. A gas-fired water heating apparatus according to claim 1, in which the means separating the water and exhaust chambers includes a dome provided on the upper side of the exhaust chamber and extending into the lower part of the water chamber.

References Cited in the file of this patent
UNITED STATES PATENTS

| | | |
|---|---|---|
| 1,948,539 | Noack | Feb. 27, 1934 |
| 2,703,565 | Lustig | Mar. 8, 1955 |
| 2,715,390 | Tenney et al. | Aug. 16, 1955 |
| 2,748,753 | Sarrazin et al. | June 5, 1956 |
| 2,768,031 | Tenney et al. | Oct. 23, 1956 |